United States Patent [19]

Ahmann

[11] 4,258,249
[45] Mar. 24, 1981

[54] STYLUS FOR TABULATING DEVICE

[76] Inventor: John E. Ahmann, 1400 Duhig Rd., Napa, Calif. 94558

[21] Appl. No.: 80,260

[22] Filed: Oct. 1, 1979

[51] Int. Cl.³ .............................................. G07C 13/00
[52] U.S. Cl. ................................. 235/50 R; 235/89 R
[58] Field of Search ............ 235/1 R, 1 B, 50 R–50 B, 235/61 B, 85 R, 89 R, 386, 52–56; 138/118; 35/9 A, 9 C

[56] References Cited

U.S. PATENT DOCUMENTS

| | | | |
|---|---|---|---|
| 3,201,038 | 8/1965 | Harris | 235/50 R |
| 3,272,431 | 9/1966 | Dablo | 235/89 R |
| 3,424,376 | 1/1969 | Evans | 235/50 R |
| 3,662,078 | 5/1972 | Holiday | 35/9 A |

*Primary Examiner*—John Gonzales
*Assistant Examiner*—Benjamin R. Fuller
*Attorney, Agent, or Firm*—Owen, Wickersham & Erickson

[57] ABSTRACT

A punching stylus for tabulating devices wherein the stylus is inserted through a selected hole in a rigid top plate of the device and through an aligned tabulating card. The stylus comprises a slender, rigid rod having a hardened tip and mounted within a non-rigid handle member in such a way that the handle is flexible relative to the rod. Thus, in use, the rod of the stylus will not break if the stylus is moved laterally or bent over when inserted in the plate hole of a tabulating device.

4 Claims, 4 Drawing Figures

U.S. Patent  Mar. 24, 1981  4,258,249
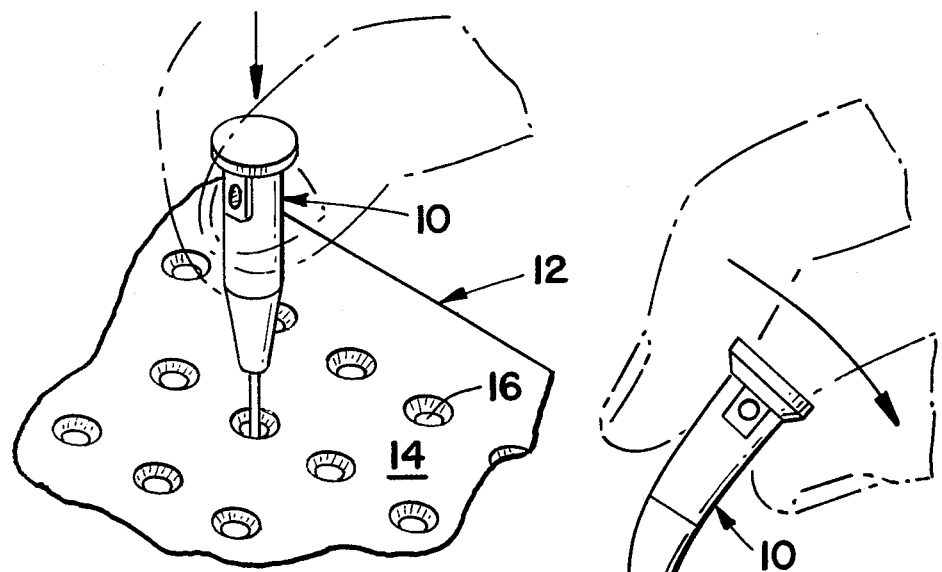
FIG_1
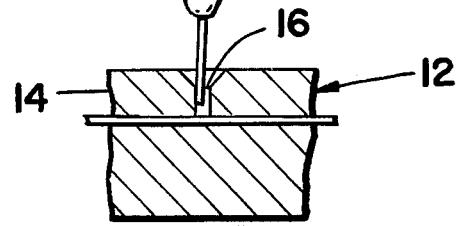
FIG_2
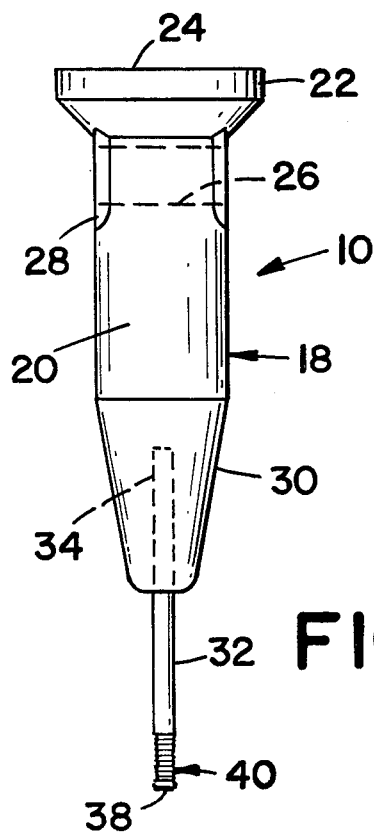
FIG_3
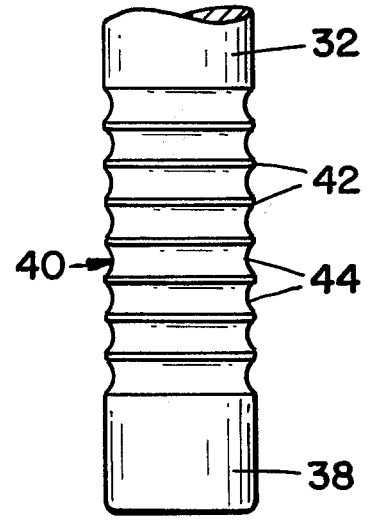
FIG_4

STYLUS FOR TABULATING DEVICE

BACKGROUND OF THE INVENTION

This invention relates to an improved marking stylus for use with tabulating or voting devices and the like.

In voting devices, such as those described in U.S. Pat. No. 3,201,038, a tabulation sheet is placed under a rigid upper plate having a series of holes which are aligned with perforated punch out areas on the tabulation sheet. The selection of a particular punch out area for the purpose of tabulating a "vote" is accomplished by insertion of a stylus through the appropriate upper plate hole and through the tabulation sheet. In stylus devices heretofore provided, a problem arose of inadvertent breakage of the stylus tips when in use. Most breakage occurred when the stylus was improperly bent to one side with its tip portion within a marking hole of the voting device.

It is therefore a general object of the present invention to provide an improved stylus for punch-through tabulating devices that has increased strength and flexibility and cannot be broken even when misused by exerting side loads on the stylus handle with its pin portion restrained within the hole of a tabulating device.

Another object of the invention is to provide a punching stylus for tabulating devices and the like that is particularly well adapted for ease and economy of manufacture.

BRIEF SUMMARY OF THE INVENTION

A stylus according to the principles of the present invention comprises a rigid pin member, having one end which is embedded within a tapered end portion of a flexible handle member. The taper of the end portion is such that it is substantially flexible with the main body of the stylus handle. Thus, in use, if a side load is applied to the stylus when the tip of its pin member is in a hole of the tabulating device, the handle will flex with respect to its tapered portion and only a limited amount of stress (well below the breaking point) can be applied to the stylus pin. At the end of the stylus pin, which is the most critical stress area in use, the yield strength of the pin is increased by means such as heat treatment, so that an additional safety margin is provided.

BRIEF SUMMARY OF THE DRAWING

FIG. 1 is a fragmentary view in perspective showing a stylus according to the present invention in normal use with a tabulating device;

FIG. 2 is a view in elevation of a stylus according to the present invention showing its flexibility in use;

FIG. 3 is a somewhat enlarged view in elevation of the stylus of FIG. 2; and

FIG. 4 is a fragmentary view, partially in section, showing the free serrated end of the rigid stylus tip.

DETAILED DESCRIPTION OF EMBODIMENT

With reference to the drawing, FIG. 1 shows a stylus 10 embodying the principles of the present invention when in normal use with a tabulating device 12. The latter may be such a device used for voting and comprises a rigid upper plate 14 with a series of holes 16 spaced above a base member (not shown). A paper tabulating sheet with scored punch-out areas is installed between the plate and its base member so that the punch-out areas are properly registered beneath the holes. Thus, by inserting the stylus in a preselected hole, the desired punch-out area can be broken away from the tabulating sheet to provide a tabulating record.

In FIG. 2, the stylus 10 is shown as it might often be mishandled in use wherein a side force is applied that heretofore caused breakage of the stylus. However, as indicated, the stylus 10 of the present invention, even though bent improperly to one side in a typical position of misuse, will merely flex and will not break.

As shown in FIG. 3, the stylus 10 comprises a handle member 18 of rubber or rubber-like material that is flexible to a degree and yet durable. This handle member has a main cylindrical shaped body 20 with an integral enlarged head 22, preferably having a flat top surface 24. Just below the head is a transverse passage 26 for receiving a retaining chain or cord (not shown). At each opposite end of this passage is, preferably, an annular outwardly projecting portion 28 on the body that forms a reinforcement around the passage end. Extending forwardly from the body, is an integral tapered portion 30 whose length is somewhat shorter than the cylindrical body section. The angle of taper (e.g. 12°) is such that the tapered portion is quite flexible relative to the adjacent body portion 20.

Embedded within the tapered portion 30 is an elongated tip member 32 which is adapted to be inserted through a perforated guide plate of a tabulating device in order to perform the normal punch-out function on a tabulating card or sheet. This tip member is made from a hard, durable material such as AISI type 440C stainless steel. Its inner end has a knurled section 34 having a length of around 0.10–0.15 inches which is sufficient to retain the tip member firmly within the tapered end portion. This knurled end of the tip member extends into the tapered portion for about three quarters of its length and is axially aligned with the tapered and body portions of the stylus.

An outer exposed portion of the tip member extends beyond the end of the tapered body portion for a length approximately equal to the length of the tapered portion. At its outer end, as shown in FIG. 4, the tip member has a smooth cylindrical portion 38 adjacent a short ribbed or serrated section 40, and this outer end portion is preferably heat treated to increase hardness (to a Rockwell RC hardness of 54 to 57) while maintaining toughness and overall strength for the stylus. The ribbed section has narrow (0.001 inch) ribs 42, separated by wider, indented recesses 44 (0.009 inches). Thus, in use, the ribbed end of the tip member will readily punch-out the precut area of a tabulating card and assure the removal of this punched-out portion (or "chad") from the card.

As illustrated in FIG. 2, shape and strength of the tip member 32, combined with the flexibility of the tapered portion 30 of the stylus body, enables the stylus to be grossly misused and mistreated without breaking. This reliability and durability is an important factor in the success and usefulness of the stylus and its entire related tabulating device.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A punch-out stylus for use with a tabulating device having an upper plate with holes adapted to register with scored punch-out areas on a tabulation sheet placed under the plate, said stylus comprising:
- a main body section adapted to be gripped by the stylus user;
- a tapered body section extending axially from said main body section and made of a flexible, elastomeric material;
- a rigid pin member axially aligned with and having one end embedded within said tapered body section, with a portion of said pin member extending beyond the small end of said tapered body section; and a blunt, hardened and serrated tip portion at the outer end of said pin member; whereby said pin member can be inserted into any hole in the upper plate of said tabulating device and said body can be bent to one side to cause flexing of said tapered body portion without breaking said pin member.

2. The stylus as described in claim 1 wherein the embedded end portion of said pin member has a knurled section and extends into said tapered body portion for approximately three quarters of its length.

3. The stylus as described in claim 1 wherein the angle of taper for said tapered body portion is around 10° to 15° with respect to its longitudinal axis.

4. The stylus as described in claim 1 wherein the outer serrated end portion of said pin member is comprised of spaced-apart, relatively narrow ribs, separated by annular recesses and heat treated to a Rockwell (RC) hardness of 54–57.

* * * * *